(12) United States Patent  
Sistla et al.

(10) Patent No.: US 9,100,308 B2  
(45) Date of Patent: Aug. 4, 2015

(54) WIRELESS NETWORK FACILITATOR AND MONITOR

(71) Applicants: Amber Sistla, Hillsboro, OR (US); Jeremy Rover, Beaverton, OR (US); Asha Keddy, Portland, OR (US)

(72) Inventors: Amber Sistla, Hillsboro, OR (US); Jeremy Rover, Beaverton, OR (US); Asha Keddy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 13/865,355

(22) Filed: Apr. 18, 2013

(65) Prior Publication Data

US 2013/0229937 A1     Sep. 5, 2013

Related U.S. Application Data

(62) Division of application No. 12/551,160, filed on Aug. 31, 2009, now Pat. No. 8,428,004, which is a division of application No. 11/027,009, filed on Dec. 30, 2004, now Pat. No. 7,593,366.

(51) Int. Cl.
```
H04W 4/00      (2009.01)
H04L 12/26     (2006.01)
H04M 1/725     (2006.01)
H04W 4/24      (2009.01)
```

(52) U.S. Cl.
CPC ....... *H04L 43/0876* (2013.01); *H04M 1/72519* (2013.01); *H04W 4/24* (2013.01)

(58) Field of Classification Search
CPC . H04W 80/04; H04L 29/06027; H04L 29/06; H04M 1/72519

USPC ......... 370/328, 352, 252; 709/246; 455/550.1  
See application file for complete search history.

(56) References Cited

U.S. PATENT DOCUMENTS

| | | | |
|---|---|---|---|
| 6,724,730 B1 | 4/2004 | Mlinarsky et al. | |
| 6,757,521 B1 | 6/2004 | Ying | |
| 6,901,442 B1 | 5/2005 | Schwaller et al. | |
| 7,206,547 B2 | 4/2007 | Voutilainen et al. | |
| 7,257,560 B2 | 8/2007 | Jacobs et al. | |
| 7,356,615 B2 * | 4/2008 | Cai et al. ................. | 709/246 |
| 7,460,467 B1 * | 12/2008 | Corcoran ................. | 370/208 |
| 7,593,366 B2 | 9/2009 | Sistla et al. | |
| 8,428,004 B2 | 4/2013 | Sistla et al. | |
| 2002/0181405 A1 | 12/2002 | Ying | |
| 2004/0015761 A1 * | 1/2004 | Klotz et al. ............... | 714/738 |
| 2004/0015762 A1 * | 1/2004 | Klotz et al. ............... | 714/742 |
| 2005/0015762 A1 | 1/2005 | Steckler et al. | |

(Continued)

OTHER PUBLICATIONS

"U.S. Appl. No. 11/027,009, Final Office Action mailed Feb. 11, 2009, ", 11 pgs.

(Continued)

*Primary Examiner* — Danh Le  
(74) *Attorney, Agent, or Firm* — Schwegman Lundberg & Woessner, P.A.

(57) ABSTRACT

Techniques are presented for facilitating and monitoring wireless network connections. Clients and intermediate nodes are configured to interact with one another via network connections. Initially, the clients wirelessly connect to a select one of the intermediate nodes. Tests may be periodically issued to the clients and to the intermediate nodes to measure and track performance and quality of the network connections. Billing records may also be recorded and billing policies verified for client activities occurring during the network connections.

12 Claims, 6 Drawing Sheets

(56) References Cited

U.S. PATENT DOCUMENTS

| | | | |
|---|---|---|---|
| 2005/0050205 A1* | 3/2005 | Gordy et al. | 709/227 |
| 2005/0053008 A1 | 3/2005 | Griesing et al. | |
| 2005/0147077 A1 | 7/2005 | Sutinen et al. | |
| 2006/0168128 A1 | 7/2006 | Sistla et al. | |
| 2007/0291727 A1* | 12/2007 | Hellum et al. | 370/345 |
| 2009/0319642 A1 | 12/2009 | Sistla et al. | |

OTHER PUBLICATIONS

"U.S. Appl. No. 11/027,009, Non Final Office Action mailed Sep. 2, 2008", 10 pgs.

"U.S. Appl. No. 11/027,009, Notice of Allowance mailed May 22, 2009", 8 pgs.

"U.S. Appl. No. 11/027,009, Response filed Apr. 28, 2009 to Final Office Action mailed Feb. 11, 2009", 10 pgs.

"U.S. Appl. No. 11/027,009, Response filed Jul. 2, 2008 to Restriction Requirement mailed Jun. 2, 2008", 5 pgs.

"U.S. Appl. No. 11/027,009, Responses filed Dec. 2, 2008 to Non Final Pffoce Action mailed Sep. 2, 2008", 8 pgs.

"U.S. Appl. No. 11/027,009, Restriction Requirement mailed Jun. 2, 2008", 6 pgs.

"U.S. Appl. No. 12/551,160, Non Final Office Action mailed Aug. 16, 2012", 7 pgs.

"U.S. Appl. No. 12/551,160, Notice of Allowance mailed Dec. 28, 2012", 7 pgs.

"U.S. Appl. No. 12/551,160, Response filed Jul. 11, 2012 to Restriction Requirement mailed Jun. 13, 2012", 8 pgs.

"U.S. Appl. No. 12/551,160, Response filed Nov. 15, 2012 to Non Final Office Action mailed Aug. 16, 2012", 6 pgs.

"U.S. Appl. No. 12/551,160, Restriction Requirement mailed Jun. 13, 2012", 7 pgs.

\* cited by examiner

WIRELESS NETWORK FACILITATOR AND MONITOR

RELATED APPLICATIONS

The present application is a divisional of U.S. patent application Ser. No. 12/551,160, filed on Aug. 31, 2009, now issued as U.S. Pat. No. 8,428,004, which is a divisional of U.S. patent application Ser. No. 11/027,009 entitled: "Wireless Network Facilitator and Monitor," filed on Dec. 30, 2004, now issued as U.S. Pat. No. 7,593,366; which are all incorporated herein by reference in their entireties.

BACKGROUND INFORMATION

Wireless networking is rapidly becoming pervasive in the word economy. A variety of devices are now manufactured and bundled with wireless communication capabilities. Furthermore, governments and businesses are making wireless receivers and transmitters (hotspots) available in a variety of geographical locations, so that wireless-enabled devices can gain access to the Internet or other network services.

However, even though hotspots are increasingly being made available, some users still find it difficult to obtain a wireless connection to the Internet. This is so, because a user may only have a single account with a single Internet Service Provider (ISP) and the various hotspots that the user may connect through are often not associated with the user's desired ISP. Consequently, the user finds that he/she may need to actively maintain a variety of user identifications and accounts with a variety of ISPs or hotspots. This is inconvenient and cumbersome and does not promote seamless wireless connectivity for the users.

Typically, a particular hotspot is serviced by its own ISP, such that the particular hotspot connects through its ISP to the Internet. Moreover, the hotspot is often not configured to offer an option to a user to access a different ISP, which the user may desire. Further, different ISPs are often not configured to interface with one another; such that a hotspot is not capable of requesting from its ISP that a user authentication be passed through to the user's native ISP.

The lack of internetworking capabilities between ISPs primarily exists because of the inability to track and bill for pass through connections that may occur when one ISP interfaces with another ISP. Security and performance concerns have also prevented internetworking from being more completely deployed.

DESCRIPTION OF THE EMBODIMENTS

Figure 1:
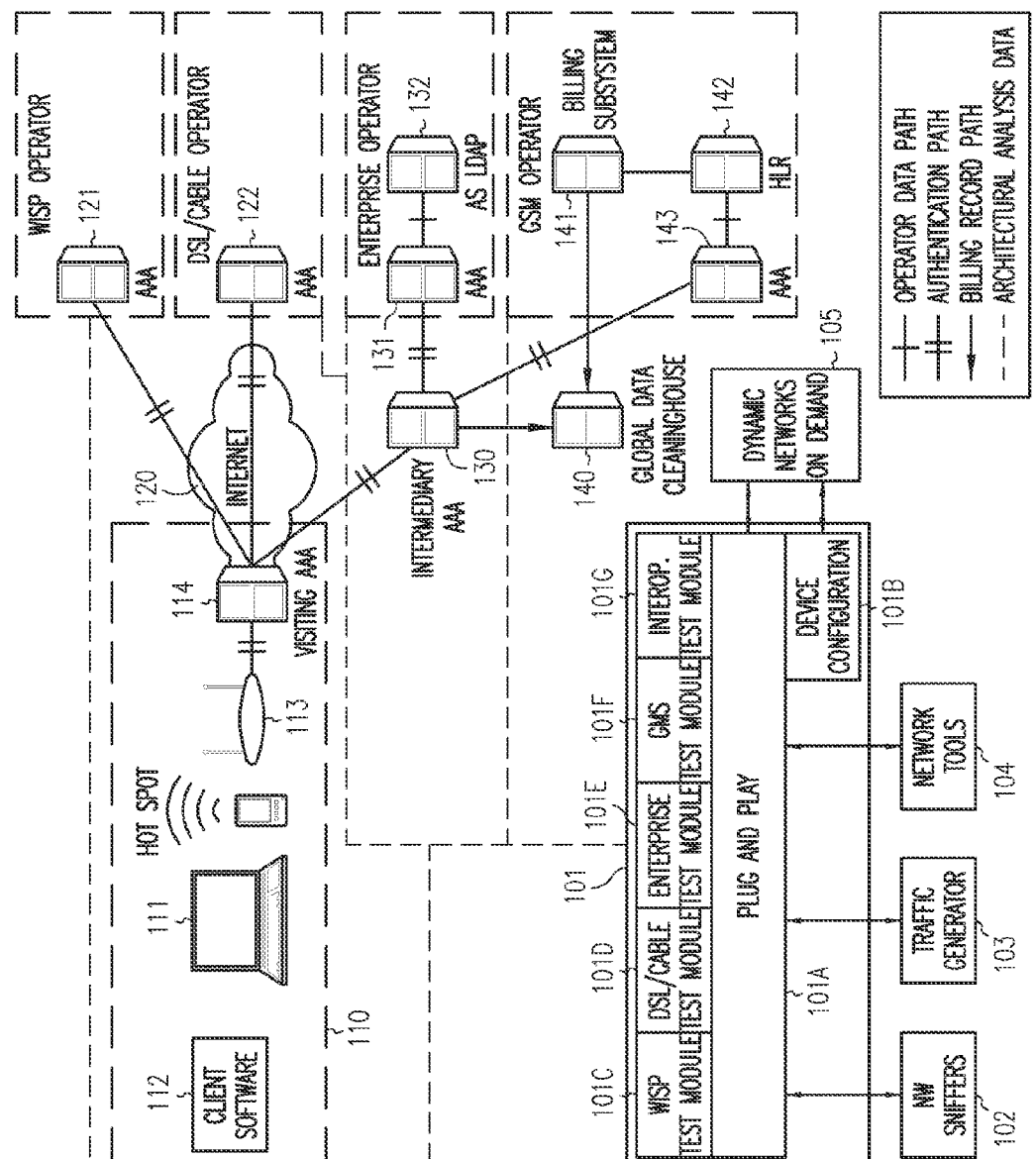
FIG. 1 is an architectural diagram of an example wireless network facilitator and monitor system, according to an example embodiment.

FIG. 1 illustrates an architectural diagram for an example wireless network facilitator and monitor system 100, according to an example embodiment. The components of the wireless network facilitator and monitor system 100 are implemented in machine-accessible and readable media. The wireless network facilitator and monitor system 100 facilitates network connections and monitors their performance and/or quality.

As used herein the phrase "client device" refers to any machine capable of wirelessly connecting to a network. A network node refers to a machine or a device that assists a client device in acquiring a network connection. The "client device" is a relative phrase because in some cases a client device may serve as a network node to facilitate a different client device in connecting to a network. Thus, depending upon the operation being performed a client device may be viewed as a network node and a network node may be viewed as a client device. Throughout the disclosure that follows, the phrase "client device" may used interchangeably with the term "client."

The wireless network facilitator and monitor system 100 includes, among other things, a management network node 101 having a plug-and-play module 101A, a device configuration module 101B, test modules 101C-101G, one or more network sniffers 102, a traffic generator 103, a variety of network tools 104, and a dynamic network on demand (DND) module 105.

The management network node 101 interacts with a wireless client environment 110 and a plurality of intermediate nodes 120-143. The wireless client environment 110 may include a client 111 having client software 112 that interacts with the management network node 101. The wireless client environment 110 may also include a wireless receiver and transmitter 113 and a visiting authentication, authorization, and accounting (AAA) node 114. The wireless client environment 110 may be located in any geographic location and provides a hotspot access to the Internet 120 for a client 111.

The AAA nodes 114, 121, 122, and 130 may also be ISPs providing access to the Internet 120 or providing access to sub-networks accessed via the Internet 120; the sub-networks may be secure (e.g., intranets) or insecure. Each of the ISPs may also interact with the management network node 101 for purposes of receiving configuration information, tests, and/or policies regarding client 111 connections through the Internet 120.

Initially, the management node 101 is used to configure the client 111 and the other nodes 113-143 (hereinafter "intermediate nodes"), which may participate in client 111 connections occurring through the Internet 120. To do this, the plug-and-play module 101A uses the device configuration module 101B to define the protocols and authentication techniques that each participant will use during a client 111 connection. In some cases, this may entail acquiring and installing a variety of digital certificates or keys on the client 111 and on the intermediate nodes 113-143.

The device configuration module 101B may also provide policies for the client 111 and the intermediate nodes 113-143. Some policies may instruct the client 111 and the nodes 113-143 on how to handle and processing a billing record. The billing record may be created by the client 111 and/or the nodes 113-143. A billing record is then forwarded to an intermediary 130. The intermediary 130 forwards to a clearinghouse 140 where a billing system 141 interacts with perhaps other systems 142 and 143 to produce a bill. The bill is then sent back to the clearinghouse 140 for subsequent submission to either a user of the client 111 or to a network ISP provider 121 or 122 associated with the user.

Thus, the wireless network facilitator and monitor system 100 may be used to enforce bill processes and to track connections occurring through the Internet 120 to a user desired ISP 121 or 122. Billing services may subsequently generate and send a bill to either the client 113 or the client's ISP 121 or 122. This is useful because a user may maintain a single ISP account with a single provider 121 or 122 and may connect via, a hotspot through the user's client 111 to that desired ISP 121 or 122, and the other ISPs and/or hotspots that participate in the client's 111 connection to the desired ISP 121 or 122 may also track and submit a bill with respect to the usage of their network resources.

The management node 101 may also submit tests to the client 111 and the intermediate nodes 113-143 and gather metrics related to the tests. The plug-and-play module 101A maintains tests 101C-101G for a variety of the intermediate nodes 113-143. Some tests may be used to ensure authentication properly occurs between the client 111 and the intermediate nodes 113-143. The tests may also track authentication paths and the time it takes to perform end-to-end authentication. Other tests may monitor the quality (packet loss) and performance (packet throughput—bandwidth rate) associated with transferring data between the intermediate nodes 113-143. Still other tests may determine whether a billing record is properly forwarded and managed by various intermediate nodes 113-143. This may also test the billing record paths to ensure it is associated with the desired client ISP.

Additionally, the device configuration module 101 and plug-and-play module 101A may define metric tracking and reporting policies for the client 111 and the intermediate nodes 113-143. Tracking and reporting policies instruct the client 111 or the intermediate nodes 113-143 to log and/or to capture metrics during tests or during normal client 111 connections. Some sample metrics may include packet loss, bandwidth rates, etc. The metrics may be reported back to the management node 101 at predefined times, upon the occurrence of predefined events, or upon the detection of a predefined condition. In an embodiment, the metrics are recorded by the client 111 and the intermediate nodes 113-143 as electronic logs that are proactively acquired when desired by the management node 101.

The management node 101 may use network tools 104 to acquire, parse, and evaluate the metrics gathered from tests or normal connections. Analysis may lead to reports being generated and sent to administrators of the intermediate nodes 113-143 for resolution or sent to users. In an embodiment, the analysis of metrics may be used to score the performance and to certify, rate, or grade the intermediate nodes 113-143. The ratings may be used by organizations associated with the intermediate nodes 113-143 for purposes of determining contractual relationships or for purposes of defining fees associated with client 111 connections being passed through the intermediate nodes 113-143. In an embodiment, the ratings of the intermediate nodes relative to the tests performed may be published for users and hotspot providers to view.

In an embodiment, the plug-and-play module 101A may also generate session identifiers or test identifiers for client 111 connections or for submitted tests. These identifiers permit the intermediate nodes 113-143 and the management node 101 to appropriately gather and track metrics and billing information for a given network connection. The session identifiers may also be generated by the client 11 or one of the intermediate nodes 113-143 and communicated to the management node 101, where it is subsequently tracked by the management node 101.

The plug-and-play module 101A may use different defined tests for different technology areas, such as a wireless internet service provider (WISP) 101C, a digital subscriber line (DSL) or a cable provider 101D, a specific enterprise 101E system, a global system for mobile communication (GSM) provider 101F, an inter-operational technology system 101G, and others. The plug-and-play module 101A may create and/or monitor identifiers associated with experiments being performed by the tests. Furthermore, the plug-and-play module 101A may use intermediate node identifiers to bring the intermediate nodes 113-143 to a desired configuration state for performing tests or for facilitating connections. This may entail downloading certificates, downloading profiles, and/or updating registries on the intermediate nodes 113-143 with credentials.

The plug-and-play module 101A also performs, drives, and coordinates any experiments that are run which are related to submitted tests. For example, the plug-and-play module 101A may coordinate authentication and authorization and coordinate with aggregators, service providers and execute different performance and data gathering tools for different types of data traffic. The plug-and-play module 101A may also signal the end of an activity, experiment, or test; collect the data (metrics) and, run the appropriate tools 105 to facilitate analysis; and send reports to interested parties, such as an aggregator.

The client software 112 is installed and executed on client devices 111. These device may be any wireless-enabled device, such as, but not limited to, a laptop, a personal digital assistant (PDA), a phone, a navigation device, an intelligent appliance, intelligent apparel (e.g., watch, glasses, etc.), and the like. The client software 112 includes a synchronization and coordinating service that interacts with the management node 101A, and a configuration service that performs registry management and certificate installation and management. The client software 112 also interacts with wireless adaptors, operating systems, and other devices or software associated with the client devices 111.

The device configuration module 101B is responsible for providing the management node 101 with the configuration information (e.g., bringing a device or node to a desired state for interaction with other devices or nodes). The configuration information may be dynamically installed and communicated to the client 111 and the intermediate nodes 113-143. The management node 101 may use the configuration information to also treat a collection of intermediate nodes 113-143 as a single resource pool or to aggregate selective ones of the intermediate nodes 113-143 into related resource pools.

The network sniffers 102 may be both wireless and wired sniffers that are used to detect or sniff traffic and to communicate data capabilities of backend devices back to the management node 101. Network sniffers 102 may be used to sniff network controller traffic on devices and generate data rich log information that may be used as the metrics associated with normal client 111 connections or with tests.

The traffic generator 103 may be used by the management node 101 to generate session, application, and network transport layer traffic. Traffic generators 103 may be used to initiate the tests and also used to collect different types of logs associated with the metrics of the tests.

The network tools 104 may be services that parse, assemble, analyze, and/or visualize data gathered from network logs. The network tools 104 may also be used to report information to interested parties (e.g., users of the client 111 or administrators of the intermediate nodes 113-143, etc.).

The DND module 105 is used to create network transitions to desired scenarios or test cases, to run network tools 104, and to run network sniffers 102, and to provide network management capabilities to the management node 101.

The components of the management node 101 cooperate and interface with the client 111 and the intermediate nodes 113-143 for purposes of facilitating a client 111 connection to a desired ISP 121 or 122; for purposes of submitting experiments via tests; and for purposes of gathering metrics and analyzing metrics related to client 111 connections and to submitted tests. Moreover, in an embodiment, a billing record may be captured and tracked during a client 111 connection.

The architectural arrangement of FIG. 1 is presented for purposes of illustration only and is not intended to limit the invention to the specific example presented in FIG. 1. In other words, one of ordinary skill in the art appreciates that other arrangements may be used without departing from the beneficial teachings presented herein.

Figure 2:
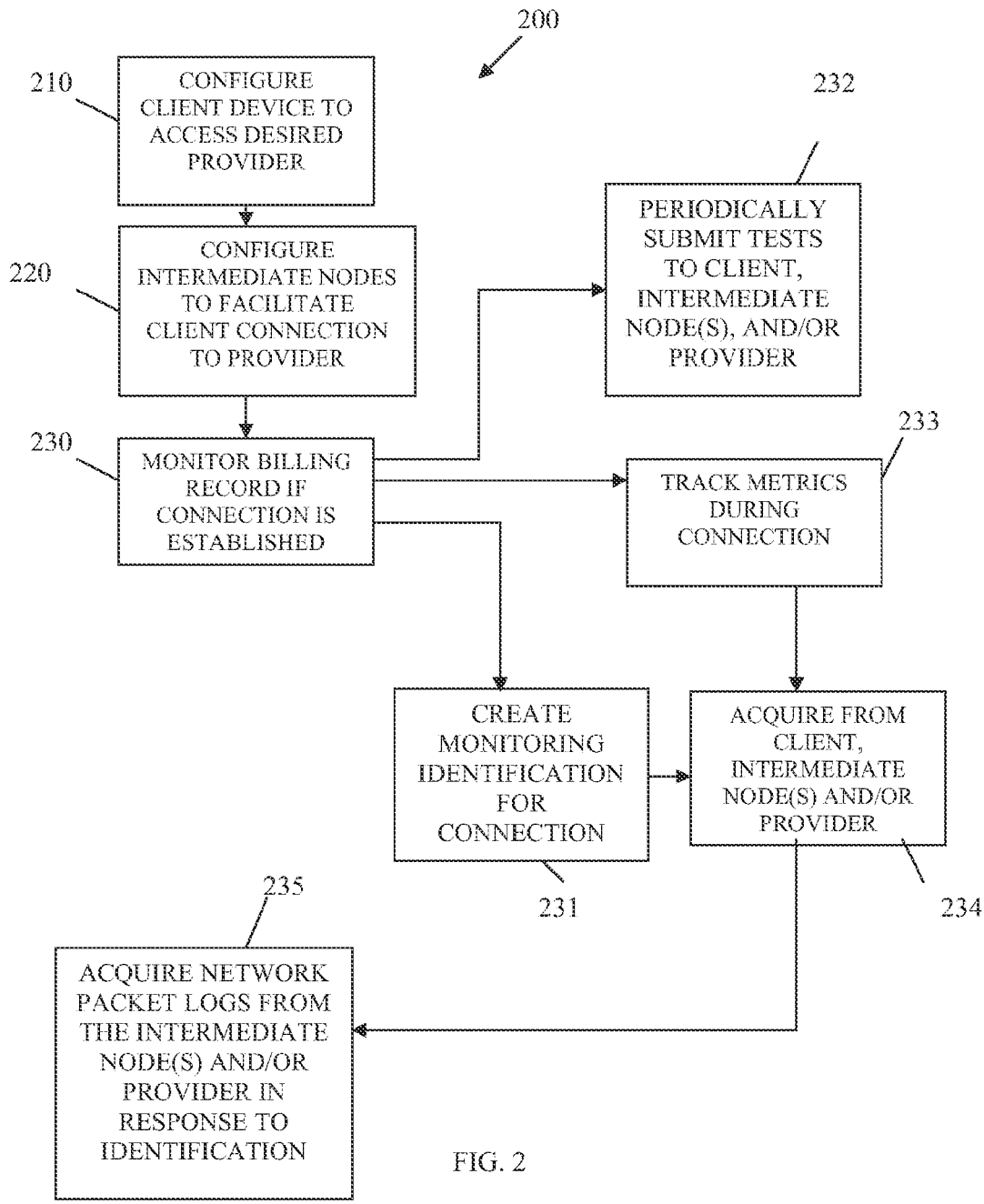
FIG. 2 is a flowchart of a method for facilitating a wireless network connection, according to an example embodiment.

FIG. 2 is a flowchart of a method 200 for facilitating a wireless network connection, according to an example embodiment. The method 200 (hereinafter referred to as a "wireless facilitator service") is implemented in a machine-accessible and readable medium and is operational over a network. The network may be wired, wireless, or a combination of wired and wireless. In an embodiment, the wireless facilitator service implements some features of the management node 101 presented above with respect to the wireless network facilitator and monitor system 100 of FIG. 1.

Initially, at 210, the wireless facilitator service configures a client device to access a desired network provider (desired client ISP) through a variety of intermediate nodes. This may entail updating the registry of the client device with digital certificates that may be used by the intermediate nodes to authenticate a user of the client device through the intermediate nodes to the desired network provider. This may also entail instructing the client device to use certain adapters or protocols when communicating with the intermediate nodes. The configuration, at 210, may occur at any point in time when the client device is connected to the wireless facilitator service. Moreover, configuration may be transparent to the user of the client device and may occur in a dynamic and real-time fashion.

At 220, the wireless facilitator service also configures intermediate nodes which may interact with the client device when the client device is connected to the desired network provider. Again, this may entail updating protocols, certificates, etc. for the client device and participating intermediate nodes. Configuration of the intermediate nodes may also occur in a dynamic and real-time fashion.

Once the client device and the participating intermediate nodes are configured to interact with one another, at 230, the wireless facilitator service monitors the billing record generated by the intermediate nodes for the client device when the client device establishes a connection through the intermediate nodes to the client device's desired network provider. In an embodiment, the wireless facilitator service may also assist in monitoring a billing record.

The client device initially wirelessly connects to a select one of the intermediate nodes. This is indicative of when the client device attempts to access the Internet from a hotspot that is equipped with a wireless transmitter and router node. The wireless transmitter and router node is one of the intermediate nodes previously configured by the wireless facilitator service. The user of the client device, during initial connection, is displayed with a typical identification (id) and password screen. At this screen, the user inputs his desired network provider's id and password as if he/she were logging directly into their desired network provider. Once the id and password are provided, the billing record is generated (by the intermediate nodes) and the billing record is monitored, at 230. The intermediate nodes then forward the connection and authentication credentials along, according to the prior configuration, until it reaches the desired network provider. A connection is then established from the client device through the hotspot and the intermediate nodes to the desired network provider. The affected intermediate nodes track the connection and may alter the billing record. A billing service processes the billing record and generates a bill for the connection when the connection terminates.

In an embodiment, at 231, the wireless facilitator service may track a monitoring identification or session identifier for the connection. The intermediate nodes may have generated the monitoring identification or session identifier. The monitoring identification may permit the association between the connection and the billing record and may permit the connection to be more readily identified and monitored by the wireless facilitator service and the intermediate nodes.

In another embodiment, at 232, the wireless facilitator service may periodically submit tests to the client device, the intermediate nodes, and/or the desired network provider of the client device. The tests may include customized experiments or pre-defined experiments associated with testing end-to-end authentication (client through intermediate nodes to desired network provider) for the connection. The tests may test the authentication paths and/or test the time it takes to perform end-to-end authentication.

It is noted, that in addition to the client device authenticating itself to each of the intermediate nodes and to the network provider that each individual intermediate node may also authenticate itself to a neighboring intermediate node. The authentication between intermediate nodes with one another may be done by agreements and may be done before the client device actually enlists the intermediate nodes to assist in a connection to its desired ISP. Tests may also test quality (packet loss percentages) and performance bandwidth rates). A test may also be used to ensure that billing records are being forwarded along to the appropriate parties (appropriate paths) and processed in manners that are expected. Again, it is noted that tests may be customized by interested parties (administrators of intermediate nodes) and made available or published with the wireless facilitator service; such that the wireless facilitator service can execute or submit the customized tests when it is appropriate to do so (based on configurable policies).

During a client device connection or during a test, at 233, the wireless facilitator service may also track metrics associated with activity of the connection or the test. One technique for doing this is to gather log data and mine the log data for packet loss percentages and bandwidth rates associated with packet transactions related to a session or monitoring identifier associated with the connection or test.

The wireless facilitator service may actively gather or acquire the metrics from the client device or the intermediate nodes, at 234, in response to the session or monitor identification, at 235. Alternatively, the wireless facilitator service may have configured the intermediate nodes and the client device to directly report the metrics to the wireless facilitator service.

Figure 3:
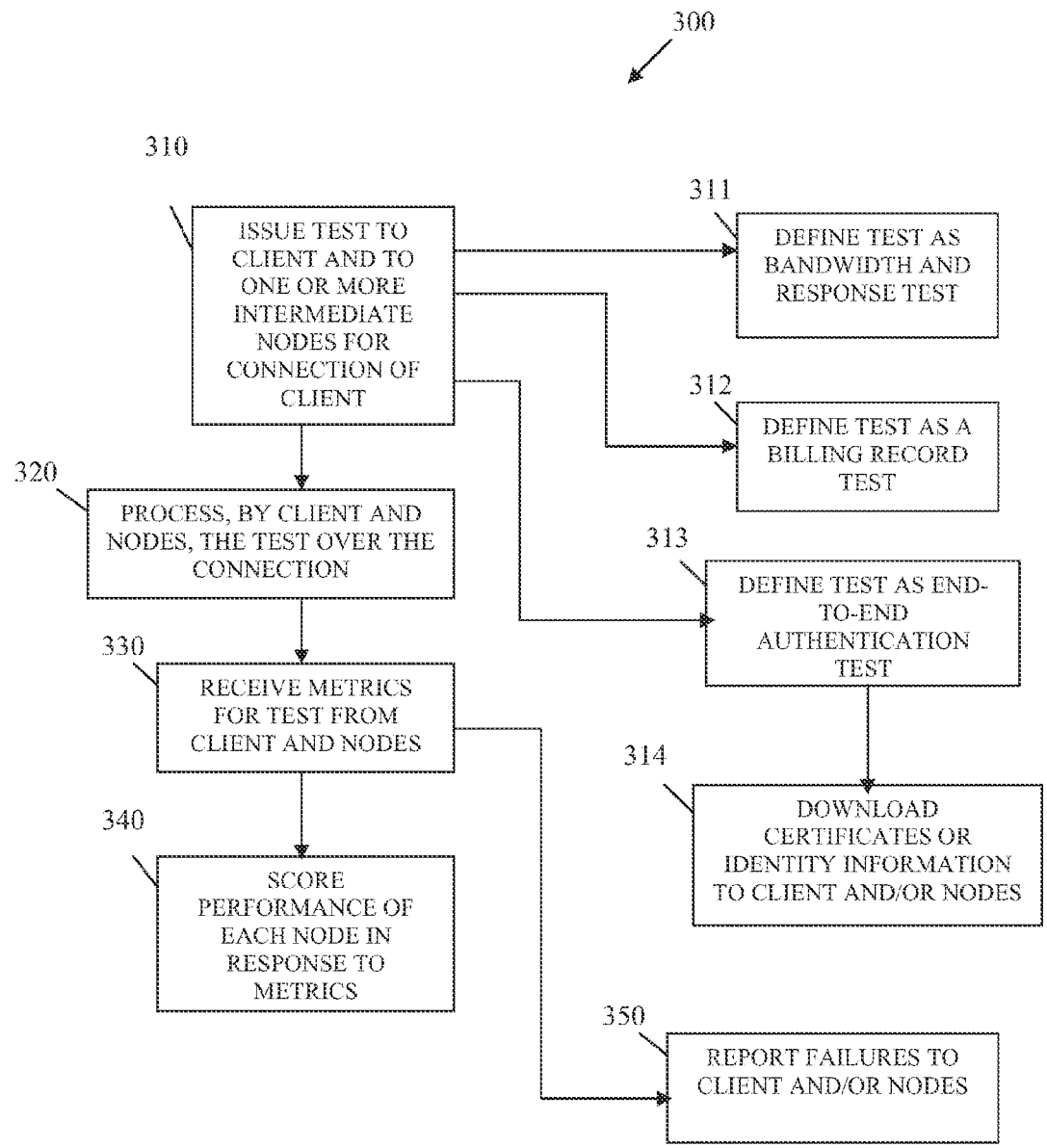
FIG. 3 is a flowchart of a method for monitoring a wireless network connection, according to an example embodiment.

FIG. 3 is a flowchart of a method 300 for monitoring a wireless network connection, according to an example embodiment. The method 300 (hereinafter "wireless monitoring service") is implemented in a machine-accessible and readable medium and is operational over a network. The network may be wired, wireless, or a combination of wired and wireless. In an embodiment, the wireless monitoring service implements some features of the management node 101 for the wireless network facilitator and monitor system 100 of FIG. 1.

Initially, a variety of tests are made accessible to the wireless monitoring service. These tests may be organized and indexed in a data store (e.g., data warehouse, database, directory, etc.) or organized as electronic files. The tests may be viewed as references or pointers to scripts or programs that may be executed on client devices and intermediate nodes during network connections where the client devices are communicating over a network connection to and through the intermediate nodes.

A test is one or more experiments that when processed monitor the quality and performance of intermediate nodes for given tasks. Some types of tests may be predefined, such as tests that test bandwidth rates, packet loss percentages, at 311. Other tests may monitor the processing of billing records through a connection, at 312, or may monitor end-to-end authentication of a network connection, at 313. In an embodiment, at 314, end-to-end authentication may entail acquiring, downloading, and installing certificates on the client device and/or on the intermediate nodes. Additionally, in some embodiments, libraries or data repositories of tests may be developed and made accessible to the wireless monitoring service for processing in the manners described herein.

At 310, the wireless monitoring service decides to issue a test to a client device and to one or more intermediate nodes that participate in a client connection to a destination node (e.g., desired ISP, etc.). The decision to issue a specific test may be preconfigured, within the processing associated with the wireless monitoring service, and defined to occur based upon the detection of an event or condition. Alternatively, the decision to issue a specific test may be directly communicated to the wireless monitoring service via an administrative interface associated with the wireless monitoring service.

The test is received by the client device and the intermediate nodes and processed by them, at 320, over a network connection. The network connection is initially established by the client device by wirelessly connecting to a select one of the intermediate nodes. The subsequent connections between the intermediate nodes to other ones of the intermediate nodes may be wired, wireless, or a combination of wired and wireless.

During the network connection and while the test is being processed, metrics are received by the wireless monitoring service, at 330. Metrics may be mined from network transaction logs for data associated with the network connection that is performing the test. One way to identify the network connection within the logs is to associate a test identification or identifier which is carried with the packets; this may be done as part of the architecture associated with the clients and the intermediate nodes. The metrics may be acquired from the wireless monitoring service or may be sent to the wireless monitoring service from the client device and the intermediate nodes.

In an embodiment, at 340, the wireless monitoring service analyzes the metrics to score the performance and/or quality of each intermediate node for the test. The score may be used to rate or grade the intermediate nodes and may be published or made available to users or to other entities. A grade or rating may be used to establish contractual relationships between providers of the intermediate nodes or to establish fee arrangements. In some cases, the grade or rating may also be used for advertisement purposes of interested parties to tout their services.

In another embodiment, at 350, the wireless monitoring service may report failures that occur during the test to the client device and/or to the intermediate nodes. Reporting may occur via electronic mail (email) and/or via instant messaging to a user associated with the client device or to administrators associated with the intermediate nodes. In an embodiment, reporting occurs by invoking a remote service with information related to the failure. In other embodiments, the reporting of failures may be batched for a certain number of tests and reported at predefined times to administrators associated with the intermediate nodes or to users associated with the client device.

Figure 4:
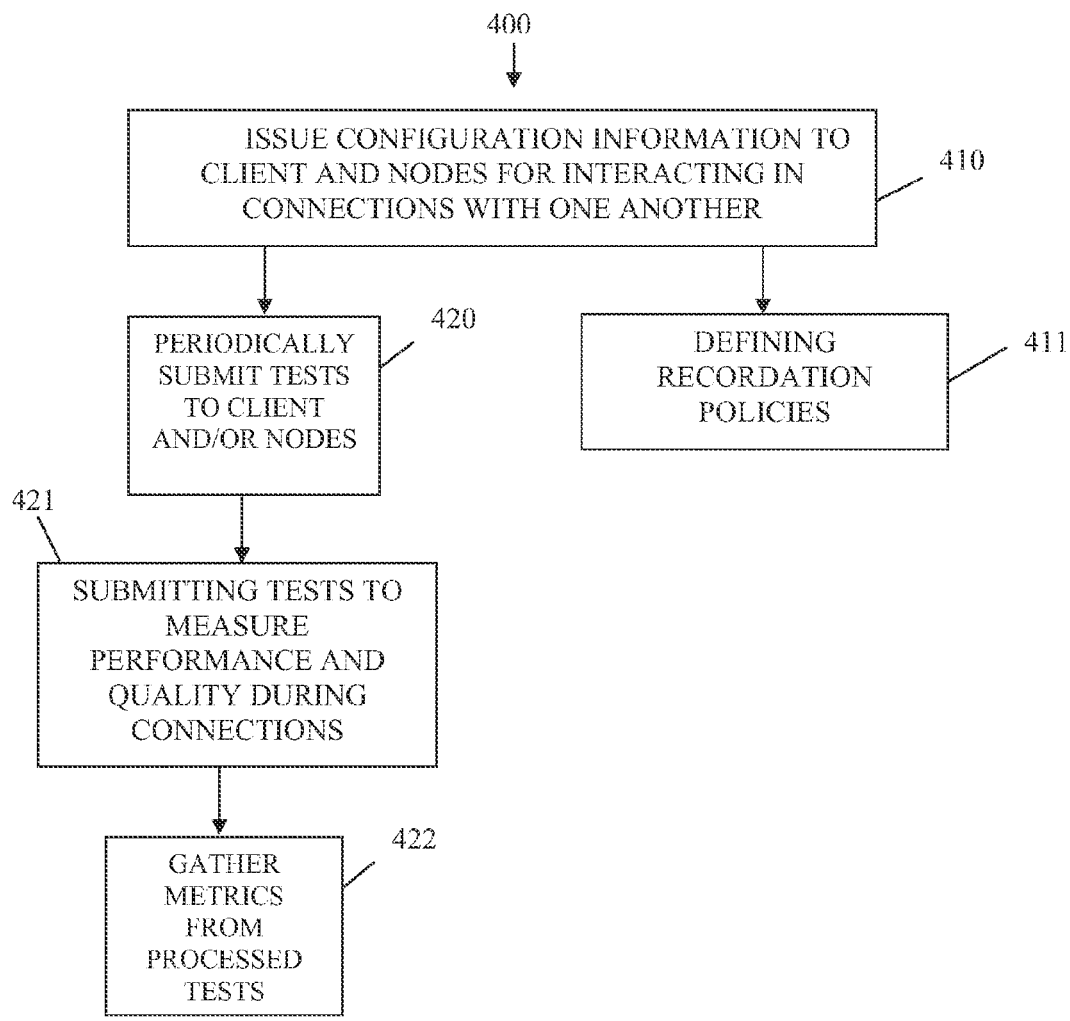
FIG. 4 is a flowchart of a method for facilitating and monitoring a wireless network connection, according to an example embodiment.

FIG. 4 is a flowchart of a method 400 for facilitating and monitoring a wireless network connection, according to an example embodiment. The method 400 is implemented as instructions within a machine accessible and readable medium on one or more machines. The instructions when executed perform the method 400 depicted in FIG. 4. In an embodiment, the instructions perform the features of the management node 101 associated with the wireless network facilitator and monitor system 100 of FIG. 1. As used herein, facilitation may be viewed as techniques for configuring.

The instructions may be downloaded from a remote processing site and installed and executed on a machine. Alternatively, the instructions may be manufactured within the hardware, firmware, or preloaded software associated with the machine. In still other embodiments, the instructions reside on removable media which are interfaced to the machine and uploaded within the machine for execution.

At 410, the instructions issue configuration information to a client device and to one or more intermediate nodes that facilitate a network connection between the client device to a desired or destination node. In an embodiment, the desired or destination node is a desired ISP that a user of the client device has an account with and uses to access the Internet.

The configuration information may also instruct the client device and the intermediate nodes to install certificates that will be used for authentication between the nodes. The configuration information may also instruct the client device and the intermediate nodes to use certain network adapters and protocols when communicating with one another.

In another embodiment, at 411, the configuration information may define recordation policies associated with capturing and recording log information or metrics which are generated during communications occurring with the connection.

The client device initially establishes a wireless network connection with a select one of the intermediate nodes. For example, the client device may be a laptop in a coffee shop. The coffee shop is a hotspot and provides wireless access via an intermediate node identified as a wireless transmitter and receiver. Because the coffee shop (intermediate node) and the laptop (client device) are preconfigured by the instructions prior to the initial communication with one another, the coffee shop's hotspot's service presents the user of the laptop with a login screen associated with the user's desired ISP. The user supplies his/her ISPs identification and password pair and the hotspot service and one or more additional intermediate nodes interact with one another to create an Internet connection for the user through the user's ISP.

At 420, the instructions periodically submit tests to the client device and/or the intermediate nodes. In an embodiment, at 421, the tests may be submitted for purposes of measuring performance (bandwidth rate) and/or quality (packet loss) associated with communications occurring during a connection. Tests may also be customized by interested parties and indexed and made accessible to the instructions for submission. In some embodiments, tests may also be predefined to test processing associated with billing records, and the like.

In an embodiment, at 421, the instructions gather metrics or log data processed during the tests by the client device and the intermediate nodes. The metrics may be actively acquired by the instructions or may be received from the client device and/or the intermediate nodes. In some embodiments, the metrics are fed to analysis tools to determine ratings or grades for the intermediate nodes. In cases where problems or failures are detected, the instructions may also send notifications to administrators, users, and/or other automated services.

Figure 5:
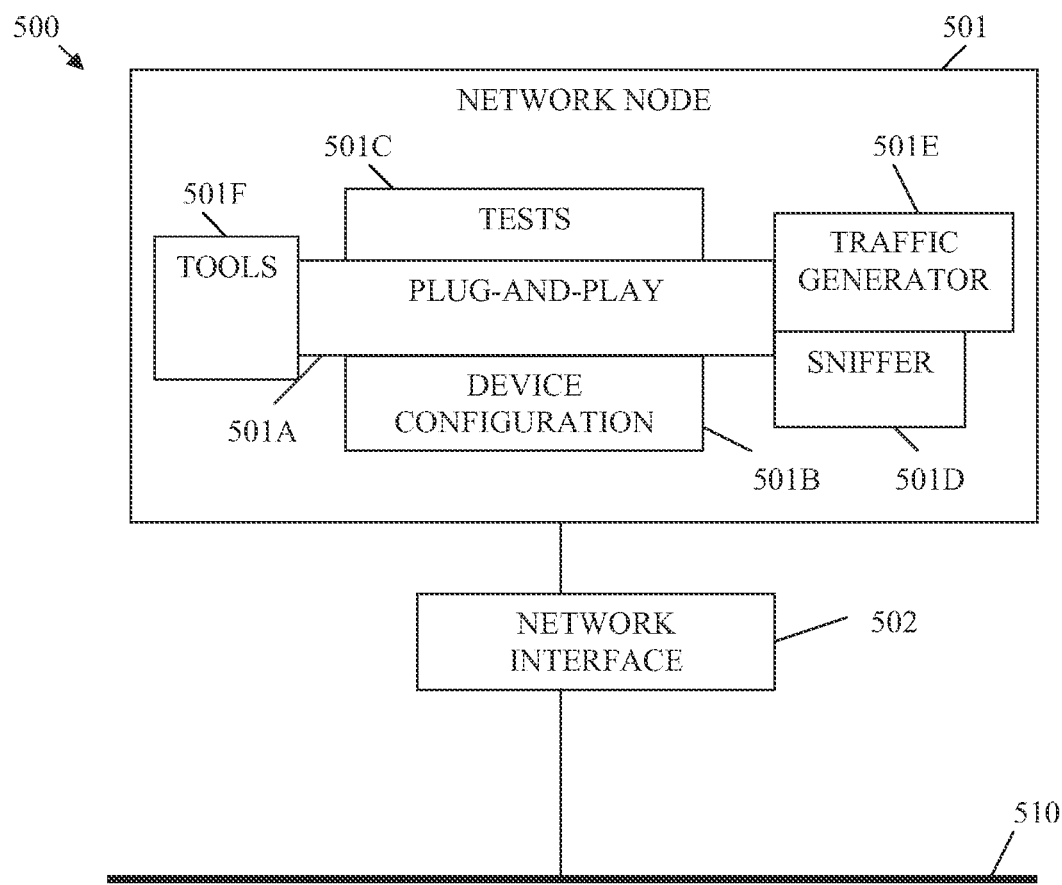
FIG. 5 is a diagram of a network facilitator and monitor apparatus, according to an example embodiment.

FIG. 5 is a diagram of a network facilitator and monitor apparatus 500, according to an example embodiment. The network facilitator and monitor apparatus 500 is implemented in a machine-accessible and readable medium and is operational over a network. In an embodiment, the network facilitator and monitor apparatus 500 represents a machine or device having the wireless network facilitation and monitoring services described herein. The processing of the network facilitator and monitor apparatus 500 may be implemented in hardware, firmware, software, or any combination of hardware, firmware, and software.

The network facilitator and monitor apparatus 500 includes a network node 501 and one or more network interfaces 502. The network node 501 further includes a plug-and-play module 501A, device configuration module 501B, and one or more tests 501C. In an embodiment, the network node 501 may also include a network sniffer 501D, a traffic generator 501E, and/or one or more network tools 501F.

The network node 501 interacts or communicates with the network interface 502 to communicate with a client device and one or more intermediate nodes over a network 510. The network 510 may be wired, wireless, or a combination of wired and wireless. The network node 501 facilitates a network connection for the client device to a desired ISP of the client device where that desired ISP may also be viewed as an intermediate node.

The client device initially establishes a connection with a select one of the intermediate nodes via a wireless connection. The intermediate nodes authenticate to one another and establish a connection for the client device through the intermediate nodes to the desired client ISP. The authentication between the intermediate nodes may be done by pre-existing agreements between the intermediate nodes and may be done in advance of the client device's attempt to establish the connection. During the client device connection with the desired ISP, billing records may be generated and processed, log data or metrics may be captured, and/or one or more tests may be performed by the participants at the behest of the network node 501.

The plug-and-play module 501A is adapted to interact with the device configuration module 501B for purposes of initially configuring the client device and the intermediate nodes for interacting with one another via network transactions associated with a client device connection to a desired ISP. The configuration information may include such things as protocols to use, authentication certificates to use, session identifiers to generate and use, and/or billing records to generate and use. The configuration information may also include recordation and reporting policies associated with information or metrics that are to be tracked, recorded, and perhaps reported by the client device and the intermediate nodes.

The plug-and-play module 501A is also adapted to identify and select the tests 501C which are periodically submitted by the network node 501 to the client device and the intermediate nodes for processing. The tests include experiments to perform. Tests can be customized or can be predefined to test such things as connection performance, quality, billing record policies, authentication, and the like.

The plug-and-play module 501A and the device configuration module 501B are adapted to process or execute within the network node 501. The tests 501C are adapted to reside in memory and/or storage associated with the network node 501. In an embodiment, the tests 501C are also adapted to process or execute within the network node 501 as instructed or initiated by the plug-and-play module 501A.

In an embodiment, the network facilitator and monitor apparatus 500 also includes a network sniffer 501D. The network sniffer 501D is adapted to monitor network transactions occurring during connections between the client device and the intermediate nodes. The network sniffer 5011D may also gather rich log information associated with the network transactions and provide that information to the network node 501.

In another embodiment, the network facilitator and monitor apparatus 500 may also include a traffic generator 501E. The traffic generator 501E is adapted to interact with the plug-and-play module 501A to generate tests or initiate test traffic during a connection on the client device and the intermediate nodes.

In still another embodiment, the network facilitator and monitor apparatus 500 may include one or more network tools 501F. The network tools 501F are adapted to collect metrics, assemble the information, and analyze the information. The network tools 501F may also identify failure conditions and may assist in reporting failures to interested parties. Additionally, the network tools 501F may rate or grade performance of the intermediate nodes relative to a particular test. The ratings or grades may be subsequently consumed by interested parties for a variety of purposes.

Figure 6:
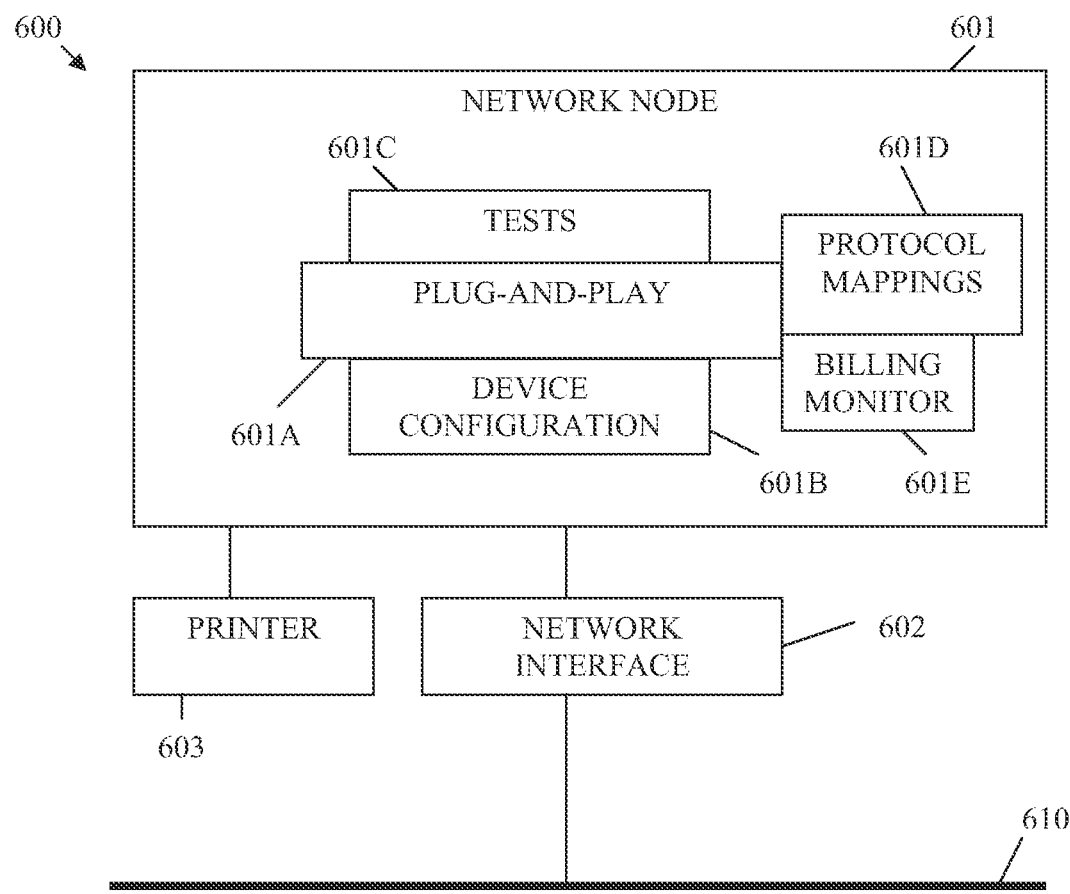
FIG. 6 is a diagram of a network facilitator and monitor system, according to an example embodiment.

FIG. 6 is a diagram of a network facilitator and monitor system 600, according to an example embodiment. The network facilitator and monitor system 600 is implemented in a machine-accessible and readable medium and is operational over a network. In an embodiment, the network facilitator and monitor system 600 includes the network facilitator and monitor apparatus 500 of FIG. 5 plus one or more additional components.

The network facilitator and monitor system 600 includes a network node 601, one or more network interfaces 602, and a printer 603. The network node includes a plug-and-play module 601A, a device configuration module 601B, and one or more tests 601C. In an embodiment, the network facilitator and monitor system 600 may also include protocol mappings 601D and a billing monitor 603.

The plug-and-play module 601A is adapted to process on the network node 601 and interacts with the device configuration module 601B to configure a client device and one or more intermediate nodes. The client device desires to establish a connection to a network (e.g., Internet) via its ISP; to do this the client device initially wirelessly connects to a select one of the intermediate nodes (e.g., a hotspot intermediate node). In an embodiment, the configuration module 601B identifies for the plug-and-play module 601B a variety of protocol mappings 601D that are to be used when configuring the client device and each of the one or more intermediate nodes. This informs the participants of the type of communication that will be used during a connection. The configuration information may also install certificates for authentication, track or monitor billing records, track and record metrics occurring during the connection, and track and/or generate session identifiers to assist with tracking.

The plug-and-play module 601A is also adapted to select from the tests 601C and to submit the tests 601C to the client device and the intermediate nodes for processing experiments during a connection. Again, tests 601C can be customized or predefined to test such things as bandwidth rates, packet loss, billing record processing, authentication, and the like.

In an embodiment, the network facilitator and monitor system 600 also includes a billing monitor 601E. The billing monitor 601E enforces billing policies for connections between client devices and the intermediate nodes. That is, billing records processed during connections may be tracked by the billing monitor 601E to ensure that bills or invoices that are sent to the appropriate parties (e.g., a user of the client device, or billing services of the user's desired ISP, etc.).

The network interface 602 is adapted to interface the network node 601 to a network 610. The network node 601 communicates with the client device and the intermediate nodes through the network interface 602. The printer 603 is adapted to print a select number of the metrics generated during a connection or to print other reports associated with the connection.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. An apparatus, comprising:
   a device plugin adapted to be executed on a device of a network;
   wherein the device plugin is adapted to configure a client device and one or more intermediate nodes to interact with one another in network transactions, and the device plugin configured to define protocols and authentication techniques that the client device and the one or more intermediate nodes process to initially connect with one another for the network transactions, and wherein the device plugin is further adapted to acquire and to selectively submit a number of the tests to the client device and to the one or more intermediate nodes and wherein the client device initially wirelessly connects to a select one of the intermediate nodes to establish the network transactions.

2. The apparatus of claim 1, wherein the device plugin is further adapted to monitor and collect billing records generated by each of the intermediate nodes.

3. The apparatus of claim 1, wherein the device plugin is adapted to track metrics generated and maintained by each of the intermediate nodes.

4. The apparatus of claim 3, wherein the device plugin is adapted to collect log files from each of the intermediate nodes where the metrics are maintained by each of the intermediate nodes.

5. The apparatus of claim 1, wherein the device plugin is adapted to periodically submit the test to track performance of each of the intermediate nodes in handling the network transactions.

6. The apparatus of claim 5, wherein the device plugin is adapted to score the performance of each of the intermediate nodes in response to the handing the network transactions.

7. The apparatus of claim 1, wherein the device plugin is adapted to define a recordation policy communicated to each of the intermediate nodes, the recordation policy defining types of information that each of the intermediate nodes is to capture and report back on to the device plugin.

8. The apparatus of claim 1, wherein the device plugin is adapted to define at least one test provided to the intermediate nodes as a bandwidth performance test.

9. The apparatus of claim 1, wherein the device plugin is adapted to define at least one test provided to the intermediate nodes as end-to-end authentication performance testing.

10. The apparatus of claim 1, wherein the device plugin is adapted to define at least one test provided to the intermediate nodes as a data quality metric test.

11. The apparatus of claim 1, wherein the device plugin is adapted to provide the tests to each of the intermediate nodes in response to a detected event raised to the device plugin.

12. The apparatus of claim 1, wherein the device plugin is adapted to provide one of the tests as a billing record test that passes a billing record through the intermediate nodes to a billing service.

* * * * *

UNITED STATES PATENT AND TRADEMARK OFFICE
CERTIFICATE OF CORRECTION

| | | |
|---|---|---|
| PATENT NO. | : 9,100,308 B2 | Page 1 of 1 |
| APPLICATION NO. | : 13/865355 | |
| DATED | : August 4, 2015 | |
| INVENTOR(S) | : Sistla et al. | |

It is certified that error appears in the above-identified patent and that said Letters Patent is hereby corrected as shown below:

Title page

On page 2, Item (56) "Other Publications", line 4, delete "Pffoce" and insert --Office--, therefor Signed and Sealed this
Second Day of February, 2016

Michelle K. Lee
*Director of the United States Patent and Trademark Office*